United States Patent
Hanafusa et al.

(10) Patent No.: US 10,622,638 B2
(45) Date of Patent: Apr. 14, 2020

(54) ELECTRODE FOR REDOX FLOW BATTERY, AND REDOX FLOW BATTERY

(71) Applicant: Sumitomo Electric Industries, Ltd., Osaka-shi (JP)

(72) Inventors: Kei Hanafusa, Osaka (JP); Kenichi Ito, Osaka (JP); Takashi Kanno, Osaka (JP); Souichirou Okumura, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 139 days.

(21) Appl. No.: 15/769,271

(22) PCT Filed: Oct. 3, 2016

(86) PCT No.: PCT/JP2016/079245
§ 371 (c)(1),
(2) Date: Apr. 18, 2018

(87) PCT Pub. No.: WO2017/068944
PCT Pub. Date: Apr. 27, 2017

(65) Prior Publication Data
US 2018/0316017 A1   Nov. 1, 2018

(30) Foreign Application Priority Data

Oct. 22, 2015   (JP) .................. 2015-208440

(51) Int. Cl.
*H01M 4/36* (2006.01)
*H01M 4/66* (2006.01)
*H01M 8/18* (2006.01)
*H01M 4/96* (2006.01)
*H01M 4/70* (2006.01)

(52) U.S. Cl.
CPC ........... *H01M 4/663* (2013.01); *H01M 4/368* (2013.01); *H01M 4/667* (2013.01); *H01M 4/70* (2013.01); *H01M 4/96* (2013.01); *H01M 8/188* (2013.01); *Y02E 60/528* (2013.01)

(58) Field of Classification Search
CPC ...... H01M 4/663; H01M 4/368; H01M 4/667; H01M 4/70; H01M 4/96; H01M 8/188; Y02E 60/528
See application file for complete search history.

(56) References Cited

U.S. PATENT DOCUMENTS

| 4,865,931 A | * | 9/1989 | McCullough, Jr. ..... D01F 9/155 429/338 |
| 5,532,083 A | * | 7/1996 | McCullough ............ H01B 1/04 252/502 |

(Continued)

FOREIGN PATENT DOCUMENTS

| EP | 0698935 A1 | 2/1996 |
| EP | 2963723 A1 | 1/2016 |

(Continued)

*Primary Examiner* — Raymond Alejandro
(74) *Attorney, Agent, or Firm* — Baker Botts L.L.P.; Michael A. Satori (57) ABSTRACT

An electrode for redox flow battery is disposed opposite a membrane of a redox flow battery. The electrode includes a fiber assembly including a plurality of carbon fibers. The fiber assembly includes soft carbon fibers with a Young's modulus of 200 GPa or less. An average carbon fiber diameter of the soft carbon fibers is preferably 20 μm or less.

7 Claims, 5 Drawing Sheets

(56) References Cited

U.S. PATENT DOCUMENTS

2014/0370404 A1* 12/2014 Kato .................. H01M 8/0241
                                                    429/418
2016/0064746 A1*  3/2016 Iino ........................ H01M 4/96
                                                    429/468
2016/0190547 A1   6/2016 Schweiss

FOREIGN PATENT DOCUMENTS

| GB | 2150741    A  | 7/1985  |
| JP | 2007-100241 A | 4/2007  |
| JP | 2009-087614 A | 4/2009  |
| JP | 2013-065530 A | 4/2013  |
| WO | 2014/168081 A1 | 10/2014 |
| WO | 2015/032667 A1 | 3/2015  |

* cited by examiner

ELECTRODE FOR REDOX FLOW BATTERY, AND REDOX FLOW BATTERY

TECHNICAL FIELD

The present invention relates to an electrode for redox flow battery and to a redox flow battery.

This application claims priority based on Japanese Patent Application No. 2015-208440, filed Oct. 22, 2015, the entire contents of which are incorporated herein by reference.

BACKGROUND ART

In a redox flow battery (RF battery) described in Patent Literature (PTL) 1, an ion exchange membrane is used as a membrane, and a nonwoven fabric composed of carbon fibers is used as a positive electrode and a negative electrode. The membrane described in PTL 1 is provided with porous sheet members on respective surfaces thereof facing the positive electrode and the negative electrode. The porous sheet members are made of a material softer than a constituent material of the positive electrode and the negative electrode.

CITATION LIST

Patent Literature

PTL 1: Japanese Unexamined Patent Application Publication No. 2013-65530

SUMMARY OF INVENTION

An electrode for redox flow battery according to an aspect of the present invention is an electrode disposed opposite a membrane of a redox flow battery, and includes a fiber assembly including a plurality of carbon fibers. The fiber assembly includes soft carbon fibers with a Young's modulus of 200 GPa or less.

A redox flow battery according to another aspect of the present invention includes a positive electrode, a negative electrode, and a membrane interposed between the positive electrode and the negative electrode. At least one of the positive electrode and the negative electrode includes the electrode for redox flow battery described above.

DESCRIPTION OF EMBODIMENTS

Figure 4:
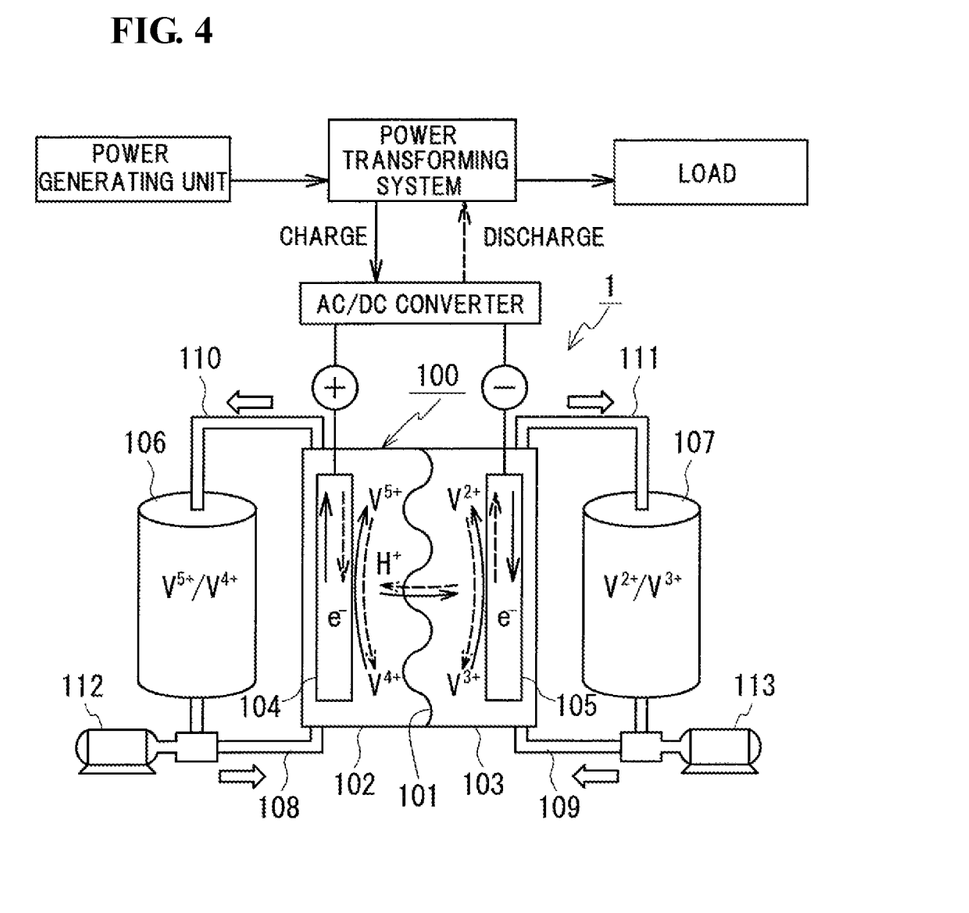
FIG. 4 is a diagram illustrating working principles of a redox flow battery.

Examples of high-capacity rechargeable batteries that store electric power from natural energy, such as solar or wind energy, include redox flow batteries (RF batteries). As in FIG. 4 illustrating working principles of an RF battery, an RF battery 1 is typically connected between a power generating unit (e.g., solar or wind power generation system, general power plant) and a load (e.g., consumer) through an AC/DC converter and a power transforming system. The RF battery 1 is charged with and stores power generated by the power generating unit, and discharges and supplies the stored power to the load.

The RF battery 1 includes battery cells 100 each divided into a positive cell 102 and a negative cell 103 by a membrane 101 that allows hydrogen ions to pass therethrough. The positive cell 102 includes a positive electrode 104, and is connected through a supply pipe 108 and a discharge pipe 110 to a positive electrode electrolyte tank 106 that stores a positive electrode electrolyte. Similarly, the negative cell 103 includes a negative electrode 105, and is connected through a supply pipe 109 and a discharge pipe 111 to a negative electrode electrolyte tank 107 that stores a negative electrode electrolyte. By pumps 112 and 113 disposed along the supply pipes 108 and 109, respectively, the positive electrode electrolyte and the negative electrode electrolyte are supplied from the supply pipes 108 and 109 to the positive cell 102 and the negative cell 103, passed therefrom through the discharge pipes 110 and 111, discharged into the positive electrode electrolyte tank 106 and the negative electrode electrolyte tank 107, and thus circulated through the positive cell 102 and the negative cell 103. By circulating the electrolytes as described above, the RF battery 1 is charged and discharged using a difference in oxidation-reduction potential between ions contained in the positive electrode electrolyte and ions contained in the negative electrode electrolyte. FIG. 4 illustrates vanadium ions as the ions contained in the positive electrode electrolyte and the negative electrode electrolyte. Note that solid arrows represent charge and broken arrows represent discharge in FIG. 4.

Figure 5:
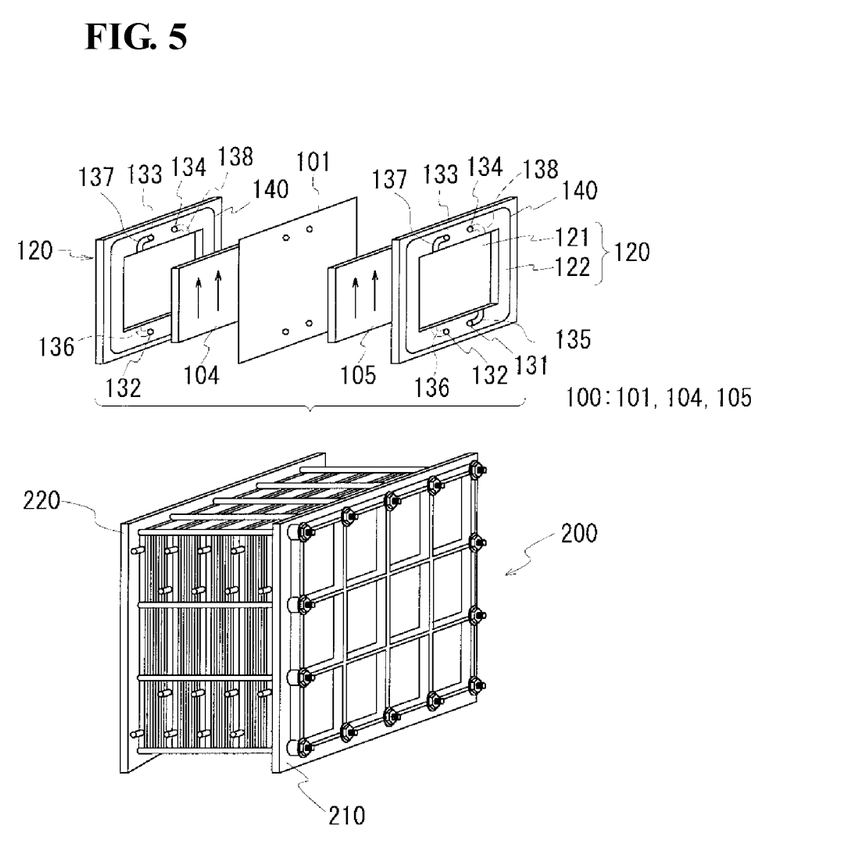
FIG. 5 is a schematic diagram illustrating a configuration of a cell stack included in a redox flow battery.

The battery cells 100 are generally formed inside a structure called a cell stack 200 shown in the lower part of FIG. 5. The cell stack 200 is sandwiched between two end plates 210 and 220 on both sides thereof, and fastened by a fastening mechanism. As illustrated in the upper part of FIG. 5, the cell stack 200 includes a multilayer body formed by stacking a cell frame 120, the positive electrode 104, the membrane 101, and the negative electrode 105 in this order. The cell frame 120 includes a rectangular bipolar plate 121 and a rectangular frame body 122 that surrounds the outer edge of the bipolar plate 121. In this configuration, one battery cell 100 is formed between bipolar plates 121 of adjacent cell frames 120, and the positive electrode 104 (positive cell 102) and the negative electrode 105 (negative cell 103) of adjacent battery cells 100 are arranged on the front and back sides of the bipolar plate 121 therebetween.

Problems to be Solved by the Present Disclosure

In the RF battery disclosed in PTL 1, the porous sheet members reduce perforation of the membrane associated with penetration of the fibers forming the positive electrode and the negative electrode into the membrane. This reduces mixing of the positive electrode electrolyte and the negative electrode electrolyte caused by perforation of the membrane, and prevents short circuit. At the same time, because of the porosity, the porous sheet members are less likely to obstruct conduction of ions and circulation of electrolytes. This means that the RF battery disclosed in PTL 1 has low cell resistivity and high current efficiency.

However, it is desirable, without requiring additional components, that the RF battery can reduce perforation of the membrane associated with penetration of the fibers forming the electrodes. In the RF battery disclosed in PTL 1, adding the porous sheet members onto the respective surfaces of the membrane facing the electrodes can prevent penetration of the positive electrode and the negative electrode into the membrane. However, this increases the number of components and makes the assembly operation complex.

In view of the circumstances described above, it is an object to provide, without requiring additional components, an electrode for redox flow battery in which the constituent material of the electrode does not easily penetrate the membrane and perforation of the membrane is easily reduced.

The present invention also aims to provide a redox flow battery that includes the electrode for redox flow battery described above and achieves low cell resistivity and high current efficiency without requiring additional components.

Advantages of the Present Disclosure

The present disclosure provides, without requiring additional components, an electrode for redox flow battery in which the constituent material of the electrode does not easily penetrate the membrane and perforation of the membrane is easily reduced.

The present disclosure also provides, without requiring additional components, a redox flow battery that has low cell resistivity and high current efficiency.

Description of Embodiments of the Present Invention

Embodiments of the present invention are first listed below.

(1) An electrode for redox flow battery according to an aspect of the present invention is disposed opposite a membrane of a redox flow battery, and includes a fiber assembly including a plurality of carbon fibers. The fiber assembly includes soft carbon fibers with a Young's modulus of 200 GPa or less.

With the configuration described above, it is possible, without requiring additional components, to make the constituent material less likely to penetrate the membrane and make the membrane less likely to be perforated. The soft carbon fibers with a low Young's modulus have better flexibility than the hard carbon fibers with a high Young's modulus. Therefore, when a redox flow battery is built using this electrode, the fibers forming the electrode are less likely to penetrate the membrane than in the case of using an electrode composed substantially of hard carbon fibers. Thus, without providing a porous sheet member between the membrane and the electrode as in the conventional technique, perforation of the membrane is easily reduced. Since there is no need to provide a porous sheet member, the number of components can be reduced and the assembly operation can be simplified.

Also, the configuration described above facilitates improvement of current efficiency. This is because since perforation of the membrane can be reduced, it is easy to reduce mixing of the positive electrode electrolyte and the negative electrode electrolyte, and thus to reduce short circuit.

Additionally, the configuration described above makes it easy to reduce the thickness of the membrane, and thus to reduce cell resistivity. This is because since the electrode includes highly flexible soft carbon fibers, perforation of the membrane is easily reduced even when the membrane is thin. Since perforation of the membrane is easily reduced even when the membrane is thin, it is easy to improve current efficiency even when the membrane is thin.

(2) In another aspect of the electrode for redox flow battery, an average carbon fiber diameter of the soft carbon fibers may be 20 μm or less.

Since this configuration increases the surface area of the fibers, it is easy to secure a sufficient area for battery reactions with the electrolyte.

(3) In another aspect of the electrode for redox flow battery, the fiber assembly may further include hard carbon fibers with a Young's modulus of over 200 GPa.

This configuration facilitates reduction of cell resistivity. Hard carbon fibers with a high Young's modulus are more resilient than soft carbon fibers with a low Young's modulus. Therefore, when a redox flow battery is built using this electrode, it is easier to provide more contacts between fibers and thus to improve electrical conductivity than in the case of using an electrode composed substantially of soft carbon fibers.

(4) In another aspect of the electrode for redox flow battery including the hard carbon fibers, the fiber assembly may have a multilayer structure including a soft fiber layer mainly composed of the soft carbon fibers and a hard fiber layer mainly composed of the hard carbon fibers. In this case, the soft fiber layer preferably forms a first side of the fiber assembly. The first side of the fiber assembly is a surface facing the membrane.

This configuration more effectively reduces perforation of the membrane when a redox flow battery is built. This is because since the soft fiber layer forms the first side of the fiber assembly, the redox flow battery is built with the soft fiber layer of high flexibility in contact with the membrane.

Additionally, when the hard fiber layer forms a second side of the fiber assembly, the redox flow battery is built with the hard fiber layer of high resilience in contact with the bipolar plate. Since the hard fiber layer and the bipolar plate can thus be made fully in contact, it is easy to reduce the contact resistance (interface resistance) between the electrode and the bipolar plate. Note that the second side of the fiber assembly is a surface facing the bipolar plate and opposite the first side.

(5) In another aspect of the electrode for redox flow battery including the hard fiber layer and the soft fiber layer, a basis weight of the soft fiber layer may range from 20 g/m$^2$ to 300 g/m$^2$.

The soft fiber layer with a basis weight of 20 g/m$^2$ or more can more effectively reduce perforation of the membrane when a redox flow battery is built. The larger the basis weight, the more likely the fibers are to penetrate the membrane. With the soft fiber layer, however, the fibers are less likely to penetrate the membrane even when the basis weight is large. When the soft fiber layer has a basis weight of 300 g/m$^2$ or less, porosities are prevented from becoming excessively small in size, and an increase in resistance against circulation of the electrolyte (internal resistance of the battery) is easily reduced.

(6) In another aspect of the electrode for redox flow battery including the hard fiber layer and the soft fiber layer, a basis weight of the hard fiber layer may range from 20 g/m$^2$ to 300 g/m$^2$.

When the basis weight of the hard fiber layer is 20 g/m$^2$ or more, it is easy to provide more contacts between fibers and improve electrical conductivity, and thus to reduce cell resistivity. When the hard fiber layer is formed on the second side of the fiber assembly, the hard fiber layer and the bipolar plate can be made fully in contact and the contact resistance between the electrode and the bipolar plate is easily reduced. When the basis weight of the hard fiber layer is 300 g/m² or less, porosities are prevented from becoming excessively small in size, and an increase in resistance against circulation of the electrolyte is easily reduced.

(7) A redox flow battery according to another aspect of the present invention includes a positive electrode, a negative electrode, and a membrane interposed between the positive electrode and the negative electrode. In this redox flow battery, at least one of the positive electrode and the negative electrode includes the electrode for redox flow battery described in any one of (1) to (6).

This configuration, which includes the electrode including soft carbon fibers, facilitates reduction of perforation of the membrane without requiring additional components and thus achieves low cell resistivity and high current efficiency.

In particular, when the electrode described in (4) is used, in which the soft fiber layer forms the first side of the fiber assembly, it is possible to more effectively reduce perforation of the membrane.

(8) In another aspect of the redox flow battery, a thickness of the membrane may range from 5 μm to 60 μm.

When the thickness of the membrane is 60 μm or less, cell resistivity can be easily reduced. This is because it is easy to improve ion permeability and thus to reduce electrical resistance. Even when the membrane is as thin as 60 μm or less, it is easy to reduce degradation in current efficiency. The thinner the membrane, the more susceptible it is to penetration of the electrode and to perforation. The resulting mixing of the positive electrode electrolyte and the negative electrode electrolyte may cause short circuit and lead to degradation in current efficiency. With the electrode described above, however, the perforation of the membrane can be reduced even when the membrane is thin. When the thickness of the membrane is 5 μm or more, the membrane is not excessively thin and it is easy to reduce perforation of the membrane.

(9) In another aspect of the redox flow battery, the thickness of the membrane may be 40 μm or less.

When the thickness of the membrane is 40 μm or less, it is easy to further reduce cell resistivity and to further reduce degradation in current efficiency.

DETAILS OF EMBODIMENTS OF THE PRESENT INVENTION

A redox flow battery according to embodiments of the present invention will now be described in detail with reference to the drawings.

Embodiment 1

A redox flow battery (RF battery) according to Embodiment 1 will be described with reference to FIG. 1 (FIGS. 4 and 5 where necessary). Like the conventional RF battery 1 described using FIGS. 4 and 5, the RF battery according to Embodiment 1 includes the cell stack 200 including a multilayer body formed by stacking the cell frames 120 (each including the bipolar plate 121 and the frame body 122) and the battery cells 100, the tank 106 storing a positive electrode electrolyte to be circulated in the positive cell 102 of each battery cell 100, and the tank 107 storing a negative electrode electrolyte to be circulated in the negative cell 103 of each battery cell 100. The positive electrode electrolyte and the negative electrode electrolyte are circulated, through the supply pipes 108 and 109 and the discharge pipes 110 and 111, by the pumps 112 and 113 disposed along the pipes. A main feature of the RF battery according to Embodiment 1 is that at least one of the positive electrode 104 and the negative electrode 105 includes a fiber assembly 20A including soft carbon fibers with high flexibility. That is, the RF battery according to Embodiment 1 differs in electrode configuration from the conventional RF battery. Since the other configurations of the conventional RF battery can be adopted as those of the RF battery of Embodiment 1, their detailed description is omitted by assigning the same reference numerals as those in FIGS. 4 and 5. The following description primarily deals with the difference.

[Electrode]

An electrode 2A performs battery reactions using circulation of the electrolyte. The electrode 2A is disposed on each of the front and back surfaces of the bipolar plate of an intermediate cell frame, and on a first surface of the bipolar plate of an end cell frame. The intermediate cell frame is a cell frame disposed between adjacent battery cells 100 (FIG. 5) of the multilayer body, whereas the end cell frame is a cell frame disposed at each end of the multilayer body. A second surface of the bipolar plate of the end cell frame has no electrode thereon, and is in contact with and electrically connected to a collector plate (not shown). The electrode 2A at any position is in contact with the membrane 101 (FIG. 5) on the first surface thereof (i.e., on the right side in FIG. 1) and in contact with the bipolar plate 121 (FIG. 5) of the cell frame 120 on the second surface thereof (i.e., on the left side in FIG. 1).

The electrode 2A includes the fiber assembly 20A including a plurality of carbon fibers. The proportion of carbon fibers to constituent materials of the fiber assembly 20A varies depending on the structure (i.e., type of fiber combination) of the fiber assembly 20A. Examples of the type of fiber combination include nonwoven fabric (carbon felt), woven fabric (carbon cloth), and paper (carbon paper). The carbon felt and the carbon cloth are composed substantially only of carbon fibers. When the fiber assembly 20A is carbon felt or carbon cloth, the proportion of carbon fibers to the constituent materials is substantially 100% by mass. Carbon paper is typically composed of carbon fibers, a binder (e.g., carbonized phenol resin), and artificial graphite powder. When the fiber assembly 20A is carbon paper, the proportion of carbon fibers to the constituent materials may be 20% by mass or more, 40% by mass or more, or 50% by mass or more.

The proportion of carbon fibers to the constituent materials can be determined by "{(total mass of all carbon fibers included in fiber assembly 20A)/(mass of fiber assembly 20A)}×100". In the case of carbon paper, the proportion of carbon fibers to the constituent materials can be determined through calculation by analyzing a secondary electron image and an X-ray computed tomography (CT) image of the fiber assembly 20A. Specifically, first, the secondary electron image and the X-ray CT image are compared to make sure that a fiber image in the X-ray CT image is properly obtained. Then, the proportion of carbon fibers to the constituent materials is calculated by "D×A×T×(1/V)×(1/S)×100", where D: density of carbon fibers (=1.8 (g/cm³));

A: volume of carbon fibers determined from X-ray CT image (cm³);

T: thickness of fiber assembly 20A (cm);

V: volume of measurement field of view in X-ray CT image (cm³); and

S: mass per area determined by measuring the mass of actual sample (g/cm$^3$).

The fiber assembly 20A includes soft carbon fibers with a Young's modulus of 200 GPa or less. The soft carbon fibers have better flexibility than hard carbon fibers with a Young's modulus of over 200 GPa (described below). Therefore, as compared to the case of using an electrode composed substantially of hard carbon fibers, the fibers forming the electrode 2A are less likely to penetrate the membrane 101 and perforation of the membrane 101 is reduced more easily. Thus, since it is easy to reduce mixing of the positive electrode electrolyte and the negative electrode electrolyte and thus to reduce short circuit, degradation of current efficiency is reduced easily. The Young's modulus of soft carbon fibers is preferably 150 GPa or less, more preferably 100 GPa or less, still more preferably 75 GPa or less, and particularly preferably 50 GPa or less. The lower limit of the Young's modulus of the soft carbon fibers is not particularly limited, but the Young's modulus of the soft carbon fibers is practically, for example, 1 GPa or more. The Young's modulus of the soft carbon fibers may be set to 10 GPa or more, or may be set to 25 GPa or more. The Young's modulus is determined by extracting carbon fibers from the fiber assembly 20A and carrying out a tensile test thereon. This measurement technique is also applicable to determining the Young's modulus of hard carbon fibers (described below).

The average diameter of the soft carbon fibers is preferably 20 μm or less. When the average diameter of the soft carbon fibers is 20 μm or less, a large surface area of fibers is ensured and it is easy to secure a sufficient area for battery reactions with the electrolyte. The average diameter of the soft carbon fibers is more preferably 15 μm or less, still more preferably 10 μm or less, and particularly preferably 9 μm or less. If the soft carbon fibers are excessively narrow, the strength of the fiber assembly 20A may be weakened. The average diameter of the soft carbon fibers may be, for example, set to 1 μm or more, or may be set to 5 μm or more. As described above, the average diameter can be measured by extracting carbon fibers from the fiber assembly 20A. The average diameter of the soft carbon fibers is an average of measured diameters of 10 or more soft carbon fibers. This measurement technique is also applicable to determining the average diameter of hard carbon fibers (described below).

Figure 2:
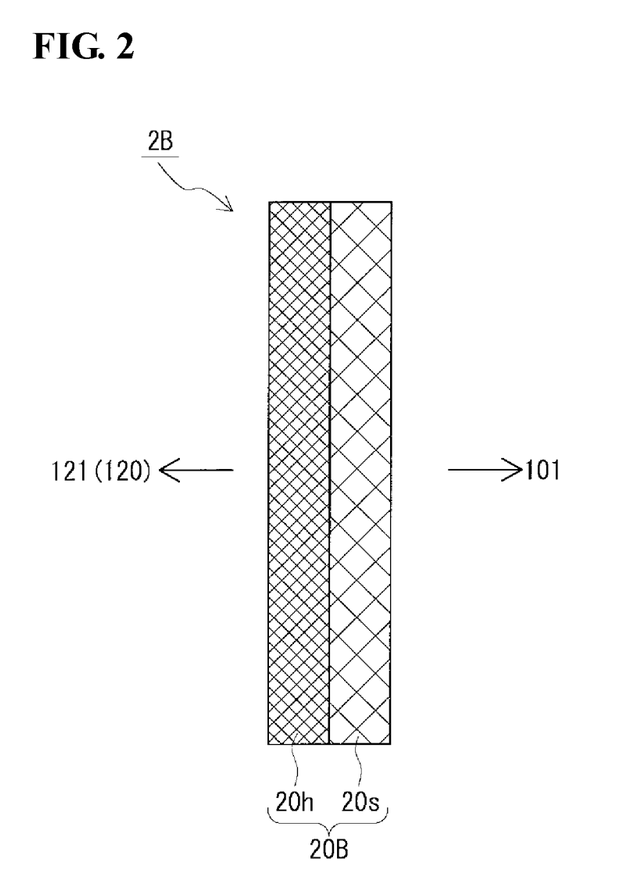
FIG. 2 is a schematic cross-sectional view of an electrode included in a redox flow battery according to Embodiment 2.
Figure 3:
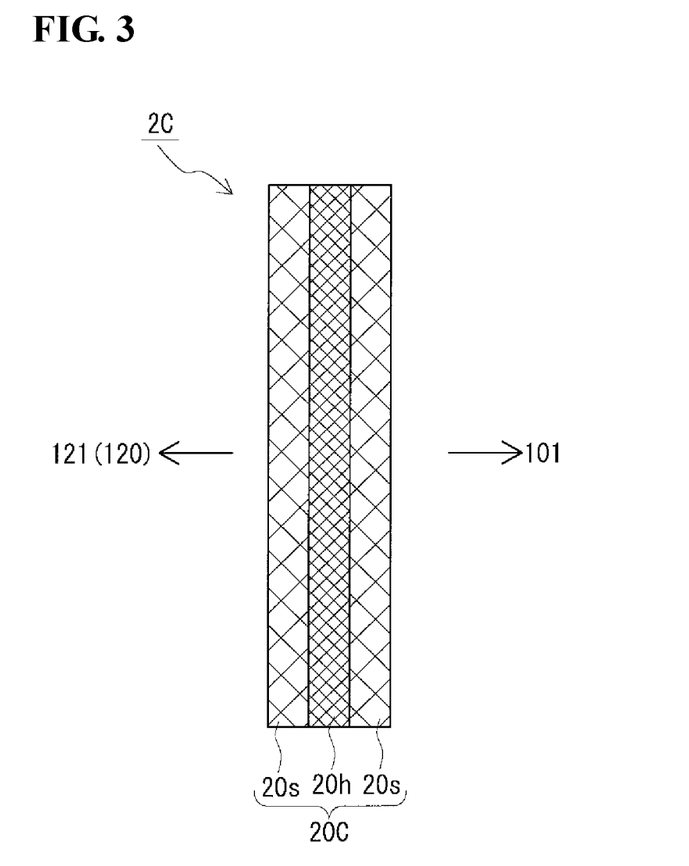
FIG. 3 is a schematic cross-sectional view of an electrode included in a redox flow battery according to Modification 1.

The larger the proportion of the soft carbon fibers to all carbon fibers included in the fiber assembly 20A, the less likely the fibers are to penetrate the membrane 101, and the less likely the membrane 101 is to be perforated. This is because when the soft carbon fibers make up a large proportion of all carbon fibers, the proportion of the soft carbon fibers on the membrane side of the fiber assembly 20A tends to be large. That is, the fiber assembly 20A preferably has, at least on the membrane side thereof, a region where the soft carbon fibers make up a large proportion. Specifically, the structure of the fiber assembly 20A can be broadly divided into the following (1) a one-layer structure (FIG. 1), and (2) and (3) multilayer structures of the soft fiber layer(s) 20s and the hard fiber layer 20h (FIGS. 2 and 3). While described in detail below, the soft fiber layer 20s is mainly composed of soft carbon fibers, and the hard fiber layer 20h is mainly composed of hard carbon fibers.

Figure 1:
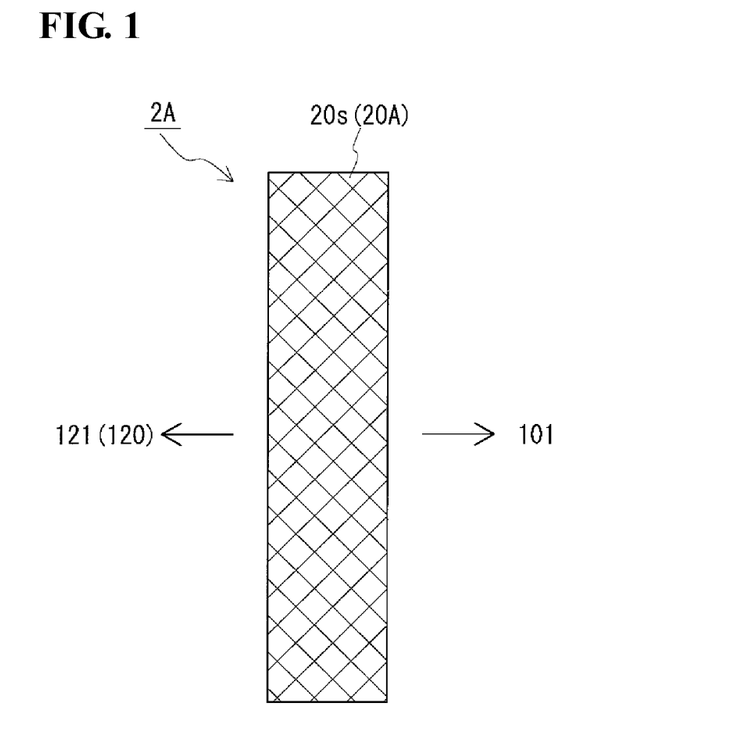
FIG. 1 is a schematic cross-sectional view of an electrode included in a redox flow battery according to Embodiment 1.

(1) One-layer structure formed by soft fiber layer 20s (FIG. 1)

(2) Two-layer structure formed by soft fiber layer 20s and hard fiber layer 20h (FIG. 2)

(3) Three-layer structure formed by two soft fiber layers 20s and hard fiber layer 20h therebetween (FIG. 3)

The fiber assembly 20A having the one-layer structure (1) illustrated in FIG. 1 will now be described. The two-layer structure (2) illustrated in FIG. 2 will be described in Embodiment 2, and the three-layer structure (3) illustrated in FIG. 3 will be described in Modification 1.

(Fiber Assembly)

The fiber assembly 20A is formed by the soft fiber layer 20s mainly composed of soft carbon fibers. The soft fiber layer 20s mainly composed of soft carbon fibers refers to a layer in which, when the fiber assembly 20A is equally divided into four regions in the thickness direction thereof, the proportion of soft carbon fibers "{(mass of soft carbon fibers)/(mass of all measured fibers)}×100" is 50% by mass or more in all the regions. The number of fibers measured in each region is equal, and the total number of measured fibers is 200 or more. Since the proportion of soft carbon fibers is 50% by mass or more in all the regions, it is easy to increase the proportion of soft carbon fibers in the region adjacent to the membrane 101. Therefore, the constituent fibers are less likely to penetrate the membrane 101 and the membrane 101 is less likely to be perforated. The proportion of the soft carbon fibers to all the carbon fibers may be set to 70% by mass or more, or may be set to 80% by mass or more. In this case, the remaining carbon fibers include hard carbon fibers (described below). The hard carbon fibers are more resilient than the soft carbon fibers. Therefore, with the hard carbon fibers, it is easy to increase the number of contacts between fibers and improve electrical conductivity, and thus to reduce cell resistivity. The proportion of the soft carbon fibers to all carbon fibers may be set to 100% by mass.

The basis weight of the soft fiber layer 20s preferably ranges from 20 g/m$^2$ to 300 g/m$^2$. When the basis weight of the soft fiber layer 20s is 20 g/m$^2$ or more, perforation of the membrane 101 is effectively reduced. This is because although a large basis weight facilitates penetration of fibers into the membrane 101, the soft fiber layer 20s with high flexibility makes it difficult for the fibers to penetrate the membrane 101 despite the large basis weight. When the basis weight of the soft fiber layer 20s is 300 g/m$^2$ or less, porosities of the electrode 2A are prevented from becoming excessively small in size, and an increase in resistance against circulation of the electrolyte is easily reduced. The basis weight of the soft fiber layer 20s is more preferably 30 g/m$^2$ or more, still more preferably 50 g/m$^2$ or more, and particularly preferably 70 g/m$^2$ or more. The basis weight of the soft fiber layer 20s is more preferably 250 g/m$^2$ or less, still more preferably 200 g/m$^2$ or less, still more preferably 180 g/m$^2$ or less, and still more preferably 150 g/m$^2$ or less.

As described above, hard carbon fibers are carbon fibers with a Young's modulus of over 200 GPa. The Young's modulus of the hard carbon fibers may be set to 225 GPa or more, 250 GPa or more, 275 GPa or more, 300 GPa or more, or 325 GPa or more. The upper limit of the Young's modulus of the hard carbon fibers is not particularly limited, but the Young's modulus of the hard carbon fibers is practically, for example, about 500 GPa or less. The Young's modulus of the hard carbon fibers may be set to 475 GPa or less, 450 GPa or less, 425 GPa or less, 400 GPa or less, or 375 GPa or less.

The average diameter of the hard carbon fibers is preferably 20 μm or less. When the average diameter of the hard carbon fibers is 20 μm or less, a large surface area of fibers is ensured and it is easy to secure a sufficient area for battery reactions with the electrolyte. The average diameter of the hard carbon fibers is more preferably 15 μm or less, and particularly preferably 10 μm or less. If the hard carbon fibers are excessively narrow, the strength of the fiber assembly 20A may be weakened. The average diameter of the hard carbon fibers may be, for example, set to 1 μm or more, or may be set to 5 μm or more.

The electrode 2A may be manufactured by a known technique using carbon fibers with a predetermined Young's modulus.

[Membrane]

The membrane 101 is interposed between the positive electrode and the negative electrode. The membrane 101 separates the positive cell and the negative cell and allows hydrogen ions ($H^+$) to pass therethrough. The membrane 101 may be an ion exchange membrane, such as a cation exchange membrane or an anion exchange membrane. The ion exchange membrane is characterized in that (1) it provides a high degree of isolation between ions of positive-electrode active material and ions of negative-electrode active material, (2) it has high permeability to hydrogen ions serving as charge carriers in the battery cell 100, and (3) it has low electron conductivity. The ion exchange membrane can be suitably used as the membrane 101. A membrane of a known type can be used as the membrane 101.

The thickness of the membrane 101 is preferably 60 μm or less. When the thickness of the membrane 101 is 60 μm or less, cell resistivity can be easily reduced. This is because it is easy to improve ion permeability and thus to reduce electrical resistance. Even when the membrane 101 is as thin as 60 μm or less, it is easy to reduce degradation in current efficiency. Generally, the thinner the membrane 101, the more susceptible it is to penetration of the electrode and to perforation. The resulting mixing of the positive electrode electrolyte and the negative electrode electrolyte may cause short circuit and lead to degradation in current efficiency. With the electrode 2A, however, the perforation of the membrane 101 can be reduced even when the membrane 101 is thin. The thickness of the membrane 101 is more preferably 40 μm or less, and particularly preferably 30 μm or less. If the membrane 101 is excessively thin, the membrane 101 may be easily damaged (or perforated). The thickness of the membrane 101 is preferably, for example, 5 μm or more. The thickness of the membrane 101 may be set to 10 μm or more, or may be set to 15 μm or more.

[Others]

Circulation of the positive electrode electrolyte and the negative electrode electrolyte in the battery cell 100 takes place through liquid supply manifolds 131 and 132 formed along a long piece (supply-side piece on the lower side in FIG. 5) of the frame body 122 and liquid discharge manifolds 133 and 134 formed along a long piece (discharge-side piece on the upper side in FIG. 5) of the frame body 122. The positive electrode electrolyte is supplied from the liquid supply manifold 131 to the positive electrode 104 through a guide groove 135 formed in the first surface of the supply-side piece of the frame body 122. Then, as indicated by arrows in the upper diagram of FIG. 5, the positive electrode electrolyte is circulated from the lower side to the upper side of the positive electrode 104 and discharged to the liquid discharge manifold 133 through a guide groove 137 formed in the first surface of the discharge-side piece of the frame body 122. Similarly, the negative electrode electrolyte is supplied from the liquid supply manifold 132 to the negative electrode 105 through a guide groove 136 formed in the second surface of the supply-side piece of the frame body 122. Then, the negative electrode electrolyte flows from the lower side to the upper side of the negative electrode 105 and is discharged to the liquid discharge manifold 134 through a guide groove 138 formed in the second surface of the discharge-side piece of the frame body 122. An annular sealing member 140, such as an O-ring or flat gasket, is placed between adjacent frame bodies 122 to suppress leakage of electrolytes from the battery cell 100.

[Operational Advantages]

In the RF battery of Embodiment 1, where the electrode 2A is formed by the soft fiber layer 20s mainly composed of highly flexible soft carbon fibers, a side of the electrode 2A adjacent to the membrane 101 can be easily formed by a region having a large proportion of soft carbon fibers. Therefore, the constituent fibers do not easily penetrate the membrane 101 and the membrane 101 is not easily perforated. Since reducing perforation of the membrane 101 reduces mixing of the positive electrode electrolyte and the negative electrode electrolyte and makes it easy to reduce short circuit, a degradation in current efficiency is easily reduced. Also, reducing perforation of the membrane 101 makes it unnecessary to additionally provide a porous sheet member, which has been conventionally provided between the membrane and the electrode to reduce perforation of the membrane 101. Therefore, it is possible to avoid an increase in the number of components. Also, reducing perforation of the membrane 101 makes it easy to reduce the thickness of the membrane 101, and thus to reduce cell resistivity.

Embodiment 2

An RF battery according to Embodiment 2 will now be described mainly with reference to FIG. 2. Embodiment 2 differs from the electrode 2A of Embodiment 1 in that an electrode 2B is formed by a fiber assembly 20B having a two-layer structure obtained by stacking the soft fiber layer 20s and the hard fiber layer 20h. Specifically, the fiber assembly 20B includes the soft fiber layer 20s forming a side of the fiber assembly 20B adjacent to the membrane 101, and the hard fiber layer 20h forming a side of the fiber assembly 20B adjacent to the bipolar plate 121. The two-layer structure (multilayer structure) refers to a structure obtained when the multilayer body (RF batteries) of the cell stack 200 (see FIG. 5) is in an assembled state. This includes both the case where the soft fiber layer 20s and the hard fiber layer 20h are separated when the cell stack 200 is disassembled, and the case where the soft fiber layer 20s and the hard fiber layer 20h are joined together and not separated when the cell stack 200 is disassembled. That is, the case where the soft fiber layer 20s and the hard fiber layer 20h are simply stacked together before assembly of the cell stack 200 is also included. The fiber assembly 20B composed of the soft fiber layer 20s and the hard fiber layer 20h joined together may include a region with sparse carbon fibers. This region, which is formed across the thickness direction of the fiber assembly 20B, corresponds to an interface between the soft fiber layer 20s and the hard fiber layer 20h. The same applies to the three-layer structure of Modification 1 (described below).

(Soft Fiber Layer)

As described above, the soft fiber layer 20s is mainly composed of soft carbon fibers. The basis weight of the soft fiber layer 20s preferably ranges from 20 g/m$^2$ to 300 g/m$^2$ as described above. The soft fiber layer 20s forms a side of the fiber assembly 20B adjacent to the membrane 101.

(Hard Fiber Layer)

The hard fiber layer 20h is mainly composed of hard carbon fibers. The phrase "mainly composed of hard carbon fibers" means that when the fiber assembly 20B is equally divided into four regions in the thickness direction thereof, the proportion of hard carbon fibers "{(mass of hard carbon fibers)/(mass of all measured fibers)}×100" is 50% by mass or more in all the regions. The number of fibers measured in each region is equal, and the total number of measured fibers is 200 or more. The hard fiber layer 20$h$ forms a side of the fiber assembly 20B adjacent to the bipolar plate 121.

The basis weight of the hard fiber layer 20$h$ preferably ranges from 20 g/m$^2$ to 300 g/m$^2$. When the basis weight of the hard fiber layer 20$h$ is 20 g/m$^2$ or more, it is easy to increase the number of contacts between fibers and improve electrical conductivity, and thus to reduce cell resistivity. Since the hard fiber layer 20$h$ forms a side of the fiber assembly 20B adjacent to the bipolar plate 121, the hard fiber layer 20$h$ and the bipolar plate 121 are fully in contact and it is easy to reduce the contact resistance between the fiber assembly 20B and the bipolar plate 121. When the basis weight of the hard fiber layer 20$h$ is 300 g/m$^2$ or less, porosities of the electrode 2B are prevented from becoming excessively small in size, and an increase in resistance against circulation of the electrolyte is easily reduced. The basis weight of the hard fiber layer 20$h$ is more preferably 30 g/m$^2$ or more, still more preferably 50 g/m$^2$ or more, and particularly preferably 70 g/m$^2$ or more. The basis weight of the hard fiber layer 20$h$ is more preferably 250 g/m$^2$ or less, still more preferably 200 g/m$^2$ or less, still more preferably 180 g/m$^2$ or less, and still more preferably 150 g/m$^2$ or less.

Before assembly of the cell stack 200, the electrode 2B including the soft fiber layer 20$s$ and the hard fiber layer 20$h$ which are joined together so as not to separate is manufactured, for example, by bonding the soft fiber layer 20$s$ and the hard fiber layer 20$h$ with a thermosetting resin, and then carbonizing the resin. In particular, when, for example, the soft fiber layer 20$s$ and the hard fiber layer 20$h$ are of carbon paper including a resin as a material, the soft fiber layer 20$s$ and the hard fiber layer 20$h$ may be individually prepared and thermally fused together. When the soft fiber layer 20$s$ and the hard fiber layer 20$h$ are either bonded together by a thermosetting resin or thermally fused together, a region with sparse carbon fibers is formed in the interface between the soft fiber layer 20$s$ and the hard fiber layer 20$h$. Although some resin portions of the interface are closed, the porosities (or porous properties) of the soft fiber layer 20$s$ and the hard fiber layer 20$h$ are maintained.

[Operational Advantages]

In the RF battery of Embodiment 2, the soft fiber layer 20$s$ forming a side of the fiber assembly 20B adjacent to the membrane 101 reduces perforation of the membrane 101. Therefore, the RF battery of Embodiment 2 easily improves current efficiency, requires no additional components for reducing perforation of the membrane 101, and easily reduces the thickness of the membrane 101 and cell resistivity. Additionally, with the hard fiber layer 20$h$ forming a side of the fiber assembly 20B adjacent to the bipolar plate 121, the number of contacts between constituent fibers of the soft fiber layer 20$s$ can be increased by using resilience of the hard fiber layer 20$h$. Therefore, the RF battery of Embodiment 2 can improve electrical conductivity more easily than Embodiment 1, and thus can reduce cell resistivity. Also, it is easy to bring the hard fiber layer 20$h$ and the bipolar plate 121 fully into contact, and thus to reduce the contact resistance between the electrode 2B and the bipolar plate 121.

Modification 1

As illustrated in FIG. 3, an electrode 2C of an RF battery according to Modification 1 is formed by a fiber assembly 20C having a three-layer structure formed by stacking two soft fiber layers 20$s$ and one hard fiber layer 20$h$. The fiber assembly 20C includes one soft fiber layer 20$s$ forming a side of the fiber assembly 20C adjacent to the membrane 101, the other soft fiber layer 20$s$ forming a side of the fiber assembly 20C adjacent to the bipolar plate 121, and the hard fiber layer 20$h$ forming a layer between the two soft fiber layers 20$s$.

In the RF battery of Modification 1, where the soft fiber layer 20$s$ forms a side of the electrode 2C adjacent to the membrane 101, it is easy to reduce penetration of constituent fibers into the membrane 101 and reduce perforation of the membrane 101, and thus to improve current efficiency. Additionally, in the RF battery of Modification 1, where the hard fiber layer 20$h$ having high resilience forms a midportion of the electrode 2C in the thickness direction, it is easy to increase the number of contacts between constituent fibers using the resilience of the hard fiber layer 20$h$. Therefore, the RF battery of Modification 1 can easily improve electrical conductivity and reduce cell resistivity. Also, with the resilience described above, it is easy to bring the bipolar plate 121 and the soft fiber layer 20$s$ forming a side of the electrode 2C adjacent to the bipolar plate 121 fully into contact. This facilitates reduction of contact resistance between the electrode 2C and the bipolar plate 121.

<Exemplary Test>

Cell resistivity ($\Omega \cdot cm^2$) and current efficiency (%) were measured by varying the electrode configuration and the membrane thickness.

In this exemplary test, six types of electrodes A, B, C, D, E, and F with different structures and two types of membranes a and b with different thicknesses were prepared, and a single cell RF battery with an electrode reaction area of 9 cm$^2$ was made. A single cell battery is a battery formed by a battery element that includes one positive cell and one negative cell. The battery was produced by placing a positive electrode and a negative electrode on both sides of an ion exchange membrane, and then sandwiching the both sides of the electrodes with cell frames each including a bipolar plate. The positive electrode and the negative electrode were each formed by appropriately combining the electrodes A, B, C, D, E, and F as shown in Table 1. In samples Nos. 1 to 6 and 11, the electrodes are each composed of two layers. Before assembly of the single cell, the two layers are separate, not joined together.

(Electrode A)
Constituent material: carbon cloth (hard fiber layer)
Constituent fibers: hard carbon fibers with a Young's modulus of 230 GPa
Average fiber diameter: 7 μm
Basis weight: 150 g/m$^2$
(Electrode B)
Constituent material: carbon cloth (soft fiber layer)
Constituent fibers: soft carbon fibers with a Young's modulus of 150 GPa
Average fiber diameter: 7 μm
Basis weight: 150 g/m$^2$
(Electrode C)
Constituent material: carbon felt (soft fiber layer)
Constituent fibers: soft carbon fibers with a Young's modulus of 25 GPa
Average fiber diameter: 15 μm
Basis weight: 300 g/m$^2$
(Electrode D)
Constituent material: carbon felt (soft fiber layer)
Constituent fibers: soft carbon fibers with a Young's modulus of 25 GPa
Average fiber diameter: 10 μm
Basis weight: 300 g/m$^2$
(Electrode E)
Constituent material: carbon felt (hard fiber layer)
Constituent fibers: hard carbon fibers with a Young's modulus of 330 GPa
Average fiber diameter: 7 μm
Basis weight: 150 g/m$^2$ (Electrode F)
Constituent material: carbon felt (soft fiber layer)
Constituent fibers: soft carbon fibers with a Young's modulus of 25 GPa
 Average fiber diameter: 7 μm
 Basis weight: 150 g/m$^2$
(Membrane a)
Constituent material: NAFION (registered trademark) 212
 Thickness: 50 μm
(Membrane b)
Constituent material: NAFION (registered trademark) 211
 Thickness: 25 μm

[Measurement of Cell Resistivity and Current Efficiency]

Vanadium sulfate solutions (vanadium concentration: 1.7 M (mol/L)) were used as a positive electrode electrolyte and a negative electrode electrolyte, and each single cell battery sample made was charged and discharged at a constant current density of 140 mA/cm$^2$. In this test, switching from charge to discharge took place when a predetermined switching voltage set in advance was reached, and multiple charge and discharge cycles were performed. After charge and discharge, cell resistivity and current efficiency were determined for each sample. A mean voltage and a mean current in any one of the multiple cycles were determined. The cell resistivity was determined by (mean voltage)/(mean current), and the current efficiency was determined by (total discharge time)/(total charge time)×100.

TABLE 1

| Sample No. | Membrane Type | Thickness (μm) | Electrode Combination | Cell Resistivity (Ω·cm$^2$) | Current Efficiency (%) |
|---|---|---|---|---|---|
| 1 | a | 50 | Positive electrode: 2 electrodes A<br>Negative electrode: 2 electrodes A<br>(Both positive and negative electrodes include only hard fiber layer) | 1.0 | 95 |
| 2 | a | 50 | Positive electrode: 2 electrodes B<br>Negative electrode: 2 electrodes B<br>(Both positive and negative electrodes include only soft fiber layer) | 1.1 | 97 |
| 3 | a | 50 | Positive electrode: 1 electrode A (hard fiber layer) + 1 electrode B (soft fiber layer)<br>Negative electrode: 1 electrode A (hard fiber layer) + 1 electrode B (soft fiber layer)<br>(Both positive and negative electrodes have multilayer structure of electrodes A and B; electrode B on membrane side) | 1.05 | 97 |
| 4 | b | 25 | Positive electrode: 2 electrodes A<br>Negative electrode: 2 electrodes A<br>(Both positive and negative electrodes include only hard fiber layer) | 0.8 | 92 |
| 5 | b | 25 | Positive electrode: 2 electrodes B<br>Negative electrode: 2 electrodes B<br>(Both positive and negative electrodes include only soft fiber layer) | 0.9 | 96 |
| 6 | b | 25 | Positive electrode: 1 electrode A (hard fiber layer) + 1 electrode B (soft fiber layer)<br>Negative electrode: 1 electrode A (hard fiber layer) + 1 electrode B (soft fiber layer)<br>(Both positive and negative electrodes have multilayer structure of electrodes A and B; electrode B on membrane side) | 0.85 | 96 |
| 7 | a | 50 | Positive electrode: 1 electrode C<br>Negative electrode: 1 electrode C<br>(Both positive and negative electrodes include only soft fiber layer) | 1.25 | 97 |
| 8 | b | 25 | Positive electrode: 1 electrode C<br>Negative electrode: 1 electrode C<br>(Both positive and negative electrodes include only soft fiber layer) | 1.05 | 96 |
| 9 | a | 50 | Positive electrode: 1 electrode D<br>Negative electrode: 1 electrode D<br>(Both positive and negative electrodes include only soft fiber layer) | 1.2 | 97 |
| 10 | b | 25 | Positive electrode: 1 electrode D<br>Negative electrode: 1 electrode D<br>(Both positive and negative electrodes include only soft fiber layer) | 1.0 | 96 |
| 11 | b | 25 | Positive electrode: 1 electrode E (hard fiber layer) + 1 electrode F (soft fiber layer)<br>Negative electrode: 1 electrode E (hard fiber layer) + 1 electrode F (soft fiber layer)<br>(Both positive and negative electrodes have multilayer structure of electrodes E and F; electrode F on membrane side) | 0.75 | 97 |

[Result of Current Efficiency]

As shown in Table 1, samples Nos. 2, 3, 5, 6, and 7 to 11 had a current efficiency of over 95%, or 96% or more. In particular, samples Nos. 2, 3, 7, 9, and 11 had a current efficiency of 97% or more. Samples Nos. 1 and 4 had a current efficiency of 95% or less.

A comparison between sample No. 1 and sample No. 4 using the same electrodes shows that the current efficiency of sample No. 4 with a thinner membrane is lower than the current efficiency of sample No. 1. Similarly, a comparison between samples No. 2 and No. 5, a comparison between samples No. 3 and No. 6, a comparison between samples No. 7 and No. 8, and a comparison between samples No. 9 and No. 10 show that the current efficiency of samples Nos. 5, 6, 8, and 10 with thinner membranes is substantially equal to the current efficiency of samples Nos. 2, 3, 7, and 9. A comparison between sample No. 1 and samples Nos. 5, 6, 8, and 10 show that the current efficiency of samples Nos. 5, 6, 8, and 10 with thinner membranes are higher than the current efficiency of sample No. 1. These comparisons reveal that when electrode B, electrode C, or electrode D formed by a soft fiber layer is provided on the membrane side, there is little degradation in current efficiency and high current efficiency is achieved even when the membrane is thin.

As described above, the current efficiencies of samples Nos. 2, 3, 5, 6, and 7 to 11 were higher than the current efficiencies of samples Nos. 1 and 4. This is probably because when electrode B, electrode C, electrode D, or electrode F formed by a soft fiber layer (soft carbon fibers) with high flexibility was provided on the membrane side, penetration of constituent fibers was more effectively reduced than when electrode A formed only by a hard fiber layer (hard carbon fibers) was on the membrane side, and perforation of the membrane was successfully reduced.

[Result of Cell Resistivity]

Of samples Nos. 1 to 3, 7, and 9 using the membranes of equal thickness, samples Nos. 2 and 3 had cell resistivities of 1.1 $\Omega \cdot cm^2$ and 1.05 $\Omega \cdot cm^2$, respectively, samples Nos. 7 and 9 had cell resistivities of 1.25 $\Omega \cdot cm^2$ and 1.2 $\Omega \cdot cm^2$, respectively, and sample No. 1 had a cell resistivity of 1.0 $\Omega \cdot cm^2$. Similarly, of samples Nos. 4 to 6, 8, 10, and 11, samples Nos. 5 and 6 had cell resistivities of 0.9 $\Omega \cdot cm^2$ and 0.85 $\Omega \cdot cm^2$, respectively, samples Nos. 8, 10, and 11 had cell resistivities of 1.05 $\Omega \cdot cm^2$, 1.0 $\Omega \cdot cm^2$, and 0.75 $\Omega \cdot cm^2$, respectively, and sample No. 4 had a cell resistivity of 0.8 $\Omega \cdot cm^2$.

Comparisons between samples using membranes of equal thickness show that the cell resistivities of samples Nos. 2 and 3 including electrode B are substantially the same as the cell resistivity of sample No. 1 including electrode A, and the cell resistivities of samples No. 5 and 6 including electrode B are substantially the same as the cell resistivity of sample No. 4 including electrode A. This reveals that using electrode B formed by a soft fiber layer can reduce cell resistivity to the same degree as using only electrode A formed by a hard fiber layer with high resilience. A comparison between samples Nos. 1 to 3 and samples Nos. 7 and 9 and a comparison between samples Nos. 4 to 6 and samples Nos. 8 and 10 reveal that using electrode C or electrode D can also reduce cell resistivity to some extent.

In particular, the result described above shows that by using both electrode A and electrode B, the cell resistivity can be made lower than that by using only electrode B and can be made closer to that by using only electrode A. This is probably because, with the resilience of electrode A, the number of contacts between fibers forming the electrode B was increased and this improved electrical conductivity. Also, since electrode A was on the bipolar plate, the electrode and the bipolar plate were fully in contact and the contact resistance between the electrode and the bipolar plate was reduced. This probably also contributed to the reduced cell resistivity.

Additionally, the cell resistivity of sample No. 11 was lower than the cell resistivity of the sample No. 6. This shows that using both electrode E and electrode F, instead of electrode A and electrode B, can further reduce the cell resistivity.

SUMMARY

The result described above shows that as compared to using only electrode A formed by a hard fiber layer, using electrode B, C, D, or F formed by a soft fiber layer can not only make the membrane thinner, but can also more effectively reduce penetration of fibers into the membrane and perforation of the membrane. The result also shows that using only electrode B can reduce cell resistivity to some extent and improve current efficiency. The result also shows that using only electrode C or electrode D can also reduce cell resistivity to some extent and improve current efficiency.

The result also shows that by using both electrode A and electrode B and positioning electrode A and electrode B on the bipolar plate side and the membrane side, respectively, the cell resistivity can be made lower than that by using only electrode B, and the current efficiency can be made as high as that by using only electrode B. The result also shows that by using both electrode E and electrode F, instead of electrode A and electrode B, and positioning electrode E and electrode F on the bipolar plate side and the membrane side, respectively, the cell resistivity can be further reduced and the current efficiency can be improved.

The present invention is not limited to the examples described above. The present invention is defined by the appended claims, and is intended to include all modifications within the meanings and scopes equivalent to the claims.

REFERENCE SIGNS LIST

1: redox flow (RF) battery
  2A, 2B, 2C: electrode
    20A, 20B, 20C: fiber assembly
    20s: soft fiber layer
    20h: hard fiber layer
100: battery cell
101: membrane 102: positive cell 103: negative cell
104: positive electrode 105: negative electrode
106: positive electrode electrolyte tank 107: negative electrode electrolyte tank
108, 109: supply pipe 110, 111: discharge pipe
112, 113: pump
120: cell frame 121: bipolar plate 122: frame body
131, 132: liquid supply manifold 133, 134: liquid discharge manifold
135, 136, 137, 138: guide groove 140: sealing member
200: cell stack 210, 220: end plate

The invention claimed is:

1. An electrode for redox flow battery, the electrode being disposed opposite a membrane of a redox flow battery, comprising a fiber assembly including a plurality of carbon fibers,
wherein the fiber assembly includes soft carbon fibers with a Young's modulus of 200 GPa or less, wherein the fiber assembly further includes hard carbon fibers with a Young's modulus of over 200 GPa, wherein the fiber assembly has a multilayer structure including a soft fiber layer mainly composed of the soft carbon fibers and a hard fiber layer mainly composed of the hard carbon fibers, and wherein the soft fiber layer forms a first side of the fiber assembly facing the membrane.

2. The electrode for redox flow battery according to claim 1, wherein an average carbon fiber diameter of the soft carbon fibers is 20 µm or less.

3. The electrode for redox flow battery according to claim 1, wherein a basis weight of the soft fiber layer ranges from 20 g/m² to 300 g/m².

4. The electrode for redox flow battery according to claim 1, wherein a basis weight of the hard fiber layer ranges from 20 g/m² to 300 g/m².

5. A redox flow battery comprising a positive electrode, a negative electrode, and a membrane interposed between the positive electrode and the negative electrode, wherein at least one of the positive electrode and the negative electrode includes the electrode for redox flow battery according to claim 1.

6. The redox flow battery according to claim 5, wherein a thickness of the membrane ranges from 5 µm to 60 µm.

7. The redox flow battery according to claim 6, wherein the thickness of the membrane is 5 µm or more and 40 µm or less.

* * * * *